Figure 1:
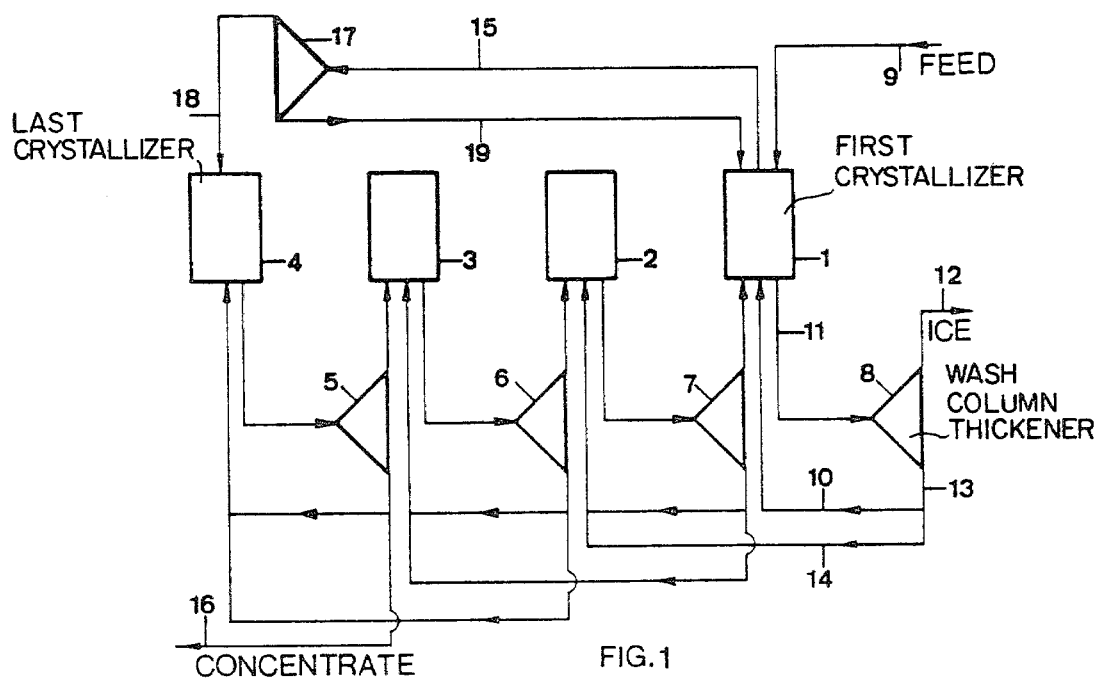

United States Patent [19]

Tijssen et al.

[11] 4,338,109

[45] Jul. 6, 1982

[54] COUNTER CURRENT CRYSTALLIZATION PROCESS

[75] Inventors: Henricus A. C. Tijssen, Son; Bernardus G. M. van der Malen, Hagestein, both of Netherlands

[73] Assignee: Douwe Egberts Koninklijke Tabaksfabriek-Koffiebranderijen-Theehandel B.V., Utrecht, Netherlands

[21] Appl. No.: 117,213

[22] Filed: Jan. 31, 1980

[30] Foreign Application Priority Data

Feb. 22, 1979 [GB] United Kingdom ............... 7906342

[51] Int. Cl.³ .............................................. B01D 9/04
[52] U.S. Cl. ......................................... 62/541; 62/542
[58] Field of Search ........................... 62/532, 541, 542

[56] References Cited

U.S. PATENT DOCUMENTS

| 3,069,864 | 12/1962 | Crosby | 62/542 |
| 3,283,522 | 11/1966 | Ganiaris | 62/542 |
| 3,872,009 | 3/1975 | Thijssen | 210/398 |

*Primary Examiner*—Norman Yudkoff
*Attorney, Agent, or Firm*—Cushman, Darby & Cushman

[57] ABSTRACT

Continuous counter current multistage process for freeze concentration, including a step whereby the ice crystals in the first stage are separated from the mother liquor in a final separation step, the ice crystals being rejected and the mother liquor from the last stage recovered as a product, whereby in a stage of said process ice crystals are introduced, said ice crystals having a larger medium size than the crystals in said stage formed without said introduction of said ice crystals.

6 Claims, 1 Drawing Figure

COUNTER CURRENT CRYSTALLIZATION PROCESS

The present invention relates to an improved counter current crystallization process.

Continuous multistage crystallizers and crystallizing processes for freeze concentration of aqueous, aroma containing liquids, such as coffee extract, fruit juices, wine, beer and acetic acid are well known, at least in literature. It has also been proposed to run these processes counter currently (U.S. Pat. No. 3,283,522). This goes to say that the mother liquor traverses the various stages in one direction, while the ice crystals traverse these stages in an opposite direction. A slurry of ice crystals and mother liquor may be withdrawn from each stage, the mother liquor being totally or for the greatest part separated from the crystals, partly recirculated to the same stage and for the rest passed on to a succeeding stage or in the last stage partly recovered as a liquid concentrate and partly recirculated. The separated crystals are passed on to the preceding stage or, from the first stage, rejected (e.g. after melting). It will be clear that the first stage is the stage where the feed is introduced. An improved process and apparatus of this kind has been described in U.S. patent application Ser. No. 866,169.

It has been found that the size of the ice crystals obtained according to this process is rather small. Depending on circumstances there may be some difficulties in using a wash column of the "packed bed" type. These wash colums are described in U.S. Pat. No. 3,872,009 and U.S. patent application Ser. No. 46,758.

In this type of wash column the ice crystals are compressed into a packed bed, which may offer considerable resistance to liquid flow. For this reason high pressures may be necessary for the washing process. This has distinct disadvantages. Not only that the wash column has to be designed to withstand this pressure, but it has been found that this may impair the stability of the wash front. Also, when other types of separation devices are used, the small size of the ice crystals is not advantageous for as good as possible a separation between the ice crystals and the liquid in between.

By practice of the present invention the size of the crystals formed in this kind of freeze concentration process may be increased in order to facilitate the separation between the ice crystals and the liquid trapped in between these crystals.

Thus, according to the present invention, in a continuous counter current multi stage process for freeze concentration, as already defined, the improvement is procured of introducing, in a stage of said process, ice crystals having a larger mean size than the crystals in said stage formed without said introduction of said ice crystals.

According to the present invention there is provided a continuous counter current multistage process for freeze concentration, as already defined, including a step whereby the ice crystals in the first stage are separated from the mother liquor in a final separation step, the ice crystals being rejected and the mother liquor from the last stage being recovered as a product, which process also comprises introducing, in a stage of said process, ice crystals having a larger mean size, than the crystals in said stage formed without said introduction of said ice crystals.

Conveniently ice crystals withdrawn from a stage are introduced in a succeeding stage, e.g., the last stage. While a beneficial effect can be observed from the recirculation of ice crystals proceeding from any stage of the series of stages to any succeeding stage of this series, this effect will generally be the more pronounced the greater the serial distance is between the stages. For this reason in a preferred embodiment of the invention ice crystals withdrawn from the first stage are introduced in the last stage. The crystals may be recirculated without first separating them from the slurry in which they occur. In doing this, however, the liquor in the succeeding stage, to which they are recirculated, will be diluted. It was, however, found according to the present invention, that in several cases the quantity of crystals to be recirculated in order to obtain a very considerable effect on the mean crystal size, is surprisingly small. In these cases the efficiency of the process is very little impaired by withdrawing a relatively small volume of slurry e.g. from the first stage and introducing this as such in the last stage. The quantity withdrawn from the first stage may be e.g. from 1 to 5% of the feed out of the first stage.

In one embodiment of the present invention the final separation step is accomplished in a "packed bed" wash column.

Proceeding this way it was e.g. found that with red wine, which was concentrated three times with only 2.5% recirculation of the ice finally fed out from the apparatus, the average size of the ice crystals increased two fold from 70 to 140 micrometer. This resulted in a decrease of the pressure drop in the wash column attached to the first stage from 7 atm to 1.5 atm.

It stands to reason that the effect is the more pronounced the greater the recirculation factor is. When the recirculated crystals are first separated from the liquid in which they occur, there is in principle no other limit to the recirculation factor than the requirement that in an equilibrated process as much ice has to be removed from as is formed in this process. Of course, however, for reasons of economy we shall not push the recirculation factor beyond what is necessary. Depending on circumstances, such as the very nature of the product to be concentrated, the concentration factor of the liquid, the cost of energy, the capital outlay for instrumentation etc. we shall choose the recirculation such as to obtain an economical optimalisation. In most cases recirculation factors of 2–20% are adequate.

While conveniently and preferentially the recirculation may be accomplished continuously, intermittent recirculation is not excluded.

According to the present invention also an apparatus is provided for applying the process described above, being an apparatus of the type mentioned above provided with means to recirculate a predetermined quantity of ice crystals per unit of time from any one stage to a succeeding stage.

The present invention will now be further described with reference to the accompanying drawing (FIG. 1) which is a schematic representation of a flow sheet for a preferred embodiment of the present invention. For details of the apparatus (that is of course without recirculation as according to the present invention) we refer to U.S. patent application Ser. No. 866,169 and to U.S. patent application Ser. No. 46,758.

Referring to the accompanying drawing the four stages of the crystallizer are shown at 1, 2, 3 and 4. Thickeners for ice slurry appear at 5, 6 and 7, while the final wash column is denoted with 8. At 17 we see an apparatus which operates as a wash column, which goes to say that it completely separates ice crystals and mother liquor. For this we refer to FIG. 8 of the U.S. patent application Ser. No. 866,169.

The liquid to be concentrated (e.g. wine) enters at 9 and is fed to stage 1 together with part of the return liquid 10 from wash column 8. Ice slurry from stage 1 is fed at 11 to wash column 8.

At 12 ice is withdrawn from the wash column 8, while at 13 the liquid separated from the ice is partly returned to stage 1 at 10 and partly, at 14, fed to stage 2. A slurry of ice crystals (containing e.g. a quantity of ice equal to 5% of the ice withdrawal at 12) is recirculated at 15 from stage 1.

A regulating mechanism, similar to that which is shown in FIG. 8 of the U.S. patent application Ser. No. 866,169 takes care that a wash front is created in the apparatus as described. In this way for all practical purposes pure ice crystals are introduced in the compartment 4 while the mother liquor is returned to stage 1. The ice crystals and mother liquor are led counter currently through the various stages, as will be clear from the figure and as described in detail in the applications mentioned above. Concentrate is withdrawn at 16.

Of course, the apparatus 17 can also operate merely as a thickener, in which case some mother liquor of stage 1 will be introduced in stage 4. It has, however, been found that up to a recirculation of 10% this does not introduce any major influence on the efficiency of the operation.

We claim:

1. In a continuous multistage process whereby an aqueous solution is successively led through a number of succeeding stages to crystallize ice in each of said stages and the ice formed is led in reverse direction through said stages whereby the ice crystals are separated from the mother liquor in a final separation stage, the ice crystals being rejected and the mother liquor from the last stage being recovered as a product, the improvement comprising introducing in one stage a portion of the crystals formed in a preceding stage other than the immediately preceding stage, said portion having a mean crystal size larger than the mean crystal size of the crystals formed in said one stage without said introduction of said portion.

2. In a process according to claim 1, whereby ice crystals withdrawn from anyone of the stages not immediately preceding the last stage are introduced into the last stage.

3. In a process according to claim 1, whereby ice crystals withdrawn from the first stage are introduced in the last stage.

4. In a process according to claims 1, 2 or 3, whereby the final separation step is accomplished in a "packed bed" wash column.

5. In a process as in claim 1 wherein 2–20% of the crystals from the first stage are introduced into the last stage.

6. In a process as in claim 1 wherein 1–5% of the feed out from the first stage is introduced into the last stage.

* * * * *